(12) United States Patent
Solenicki et al.

(10) Patent No.: US 10,688,760 B2
(45) Date of Patent: Jun. 23, 2020

(54) RAIL INTERIOR COMPLIANT THERMOPLASTIC COMPOSITE

(71) Applicant: SABIC Global Technologies B.V., Bergen op Zoom (NL)

(72) Inventors: Goran Solenicki, Bergen op Zoom (NL); Joris Wismans, Lelystad (NL); Sandeep Chandrakant Kulkarni, Stein (NL); Rein Mollerus Faber, Bergen op Zoom (NL); Erik Schwartz, Nijmegen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/337,209

(22) PCT Filed: May 11, 2018

(86) PCT No.: PCT/IB2018/053318
§ 371 (c)(1),
(2) Date: Mar. 27, 2019

(87) PCT Pub. No.: WO2018/215870
PCT Pub. Date: Nov. 29, 2018

(65) Prior Publication Data
US 2019/0291393 A1 Sep. 26, 2019

Related U.S. Application Data

(60) Provisional application No. 62/510,348, filed on May 24, 2017.

(51) Int. Cl.
*B32B 27/08* (2006.01)
*B32B 3/12* (2006.01)
(Continued)

(52) U.S. Cl.
CPC ............ *B32B 27/08* (2013.01); *B32B 3/12* (2013.01); *B32B 5/12* (2013.01); *B32B 5/245* (2013.01);
(Continued)

(58) Field of Classification Search
CPC ............ B29C 70/52; B29K 2023/12; B29K 2105/0026; B29K 2105/10; C08J 2323/12;
(Continued)

(56) References Cited

U.S. PATENT DOCUMENTS 5,102,919 A * 4/1992 Swab .................. C08J 9/0023
521/130
5,876,534 A  3/1999 Erhardt
(Continued)

FOREIGN PATENT DOCUMENTS

CN  106633420    5/1917
CN  101654535 A  2/2010
(Continued)

OTHER PUBLICATIONS

Armacell Benelux S.A., "ArmaFORM PET foam cores the green PET of the Railway Industry!", Jun. 1, 2016.
(Continued)

*Primary Examiner* — Yan Lan
(74) *Attorney, Agent, or Firm* — Norton Rose Fulbright US LLP

(57) ABSTRACT

Fire-retardant composites, methods of making fire-retardant composites, and use thereof are described. A fire-retardant composite can include at least two fire-retardant laminates, and a porous thermoplastic core material disposed between the at least two fire-retardant laminates. Each laminate can have one or more ply, each of the plies can include a plurality of fibers in a thermoplastic polymer matrix that
(Continued)

includes a fire-retardant composition. The fire-retardant composite meets European fire-retardant standards for rail transportation.

12 Claims, 6 Drawing Sheets

(51) Int. Cl.
| | |
|---|---|
| *B32B 5/12* | (2006.01) |
| *B32B 7/12* | (2006.01) |
| *B32B 17/04* | (2006.01) |
| *B32B 27/20* | (2006.01) |
| *B32B 27/06* | (2006.01) |
| *B32B 5/24* | (2006.01) |
| *B32B 5/32* | (2006.01) |
| *B32B 17/06* | (2006.01) |
| *B32B 27/28* | (2006.01) |
| *B32B 27/30* | (2006.01) |
| *B32B 27/32* | (2006.01) |
| *B32B 27/36* | (2006.01) |

(52) U.S. Cl.
CPC ............... *B32B 5/32* (2013.01); *B32B 7/12* (2013.01); *B32B 17/04* (2013.01); *B32B 17/066* (2013.01); *B32B 27/065* (2013.01); *B32B 27/20* (2013.01); *B32B 27/28* (2013.01); *B32B 27/281* (2013.01); *B32B 27/285* (2013.01); *B32B 27/286* (2013.01); *B32B 27/302* (2013.01); *B32B 27/32* (2013.01); *B32B 27/36* (2013.01); *B32B 27/365* (2013.01); *B32B 2260/021* (2013.01); *B32B 2260/023* (2013.01); *B32B 2260/046* (2013.01); *B32B 2262/101* (2013.01); *B32B 2266/025* (2013.01); *B32B 2266/0228* (2013.01); *B32B 2266/0264* (2013.01); *B32B 2266/0278* (2013.01); *B32B 2266/06* (2013.01); *B32B 2266/08* (2013.01); *B32B 2270/00* (2013.01); *B32B 2305/08* (2013.01); *B32B 2307/3065* (2013.01); *B32B 2605/00* (2013.01); *B32B 2605/003* (2013.01); *B32B 2605/10* (2013.01)

(58) Field of Classification Search
CPC ..... C08J 5/04; C08J 5/043; C08K 2003/2296; C08K 2003/329; C08K 3/22; C08K 3/32; C08K 5/529; C08K 5/5205; B32B 2250/02; B32B 2250/03; B32B 27/302; B32B 27/365; B32B 27/32; B32B 2260/023; B32B 2260/046; B32B 2266/06; B32B 2266/08; B32B 27/065; B32B 17/04; B32B 17/066; B32B 2305/08; B32B 27/20; B32B 5/12; B32B 5/245; B32B 5/32; B32B 7/12; B32B 2260/021; B32B 2262/101; B32B 2266/0228; B32B 2266/025; B32B 2266/0264; B32B 2266/0278; B32B 2270/00; B32B 2307/3065; B32B 2605/00; B32B 2605/003; B32B 2605/10; B32B 27/08; B32B 27/18; B32B 27/28; B32B 27/281; B32B 27/285; B32B 27/286; B32B 27/36; B32B 3/12; B32B 5/18

See application file for complete search history.

(56) References Cited

U.S. PATENT DOCUMENTS

| | | | |
|---|---|---|---|
| 8,568,853 B2 | 10/2013 | Raghavendran et al. | |
| 2007/0105466 A1 | 5/2007 | Murakami et al. | |
| 2007/0256379 A1 | 11/2007 | Edwards | |
| 2015/0010755 A1* | 1/2015 | Fu ........................ | C08L 69/00 |
| | | | 428/375 |
| 2015/0094409 A1* | 4/2015 | Kenny ..................... | C08J 5/04 |
| | | | 524/100 |
| 2016/0159046 A1 | 6/2016 | Abbatiello et al. | |
| 2016/0347952 A1 | 12/2016 | Schwartz et al. | |

FOREIGN PATENT DOCUMENTS

| | | |
|---|---|---|
| CN | 104608447 A | 5/2015 |
| CN | 102850646 B | 12/2015 |
| CN | 106147019 A | 11/2016 |
| WO | WO 2016051561 A1 | 4/2016 |
| WO | WO 2016102278 A1 | 6/2016 |
| WO | WO 2016174232 A1 | 11/2016 |

OTHER PUBLICATIONS

Diab Group, "Divinycell P Technical Data", Feb. 14, 2016.
International Search Report and Written Opinion for PCT/IB2018/053318, dated Jul. 23, 2018.
Pappadà et al., "Effect of the manufacturing process and skin-core adhesion efficiency on the mechanical properties of a thermoplastic sandwich", *International Committee on Composite Materials 17 Proceedings*, Jul. 30, 2009. Retrieved from http://iccm-central.org/Proceedings/ICCM17proceedings/Themes/Applications/SANDWICH%20STRUCTURES/INT%20-%20SANDWICH%20STRUCTURES/IB6.6%20Pappada.pdf on Oct. 24, 2016.
Office Action issued in counterpart Indian Application No. 201917009348, dated Feb. 5, 2020.

* cited by examiner

RAIL INTERIOR COMPLIANT THERMOPLASTIC COMPOSITE

CROSS REFERENCE TO RELATED APPLICATIONS

This application is a national phase application under 35 U.S.C. § 371 of International Application No. PCT/IB2018/053318 filed May 11, 2018, which claims the benefit of priority of U.S. Provisional Patent Application No. 62/510,348 filed May 24, 2017. The entire contents of each of the above-referenced disclosures are specifically incorporated herein by reference without disclaimer.

BACKGROUND OF THE INVENTION

A. Field of the Invention

The invention generally concerns fire-retardant composites. In particular, the fire-retardant composites are capable of meeting the rail transportation requirements for interior panels.

B. Description of Related Art

Composite laminates can be used to form structures having advantageous structural characteristics, such as high strength, high stiffness, and/or relatively low weight when compared to similar structures formed from conventional materials. As a result, laminates are used in a variety of applications across a wide range of industries, including the automotive, aerospace, rail transportation, and consumer electronics industries.

Some laminates can include fibers, which can be made by impregnating a tow of fibers with a matrix material. In traditional impregnation techniques, a relatively high viscosity matrix material is forced through a dry and relatively low permeability tow of fibers. As a result, traditional impregnation techniques can produce fiber reinforced materials that have relatively low and/or unpredictable fiber volume fractions, relatively uneven distributions of fibers within the materials, excesses of matrix material, and/or the like. This can result in fiber reinforced laminates having undesirable and/or unpredictable structural characteristics. Other methods to make fire retardant laminates can include using fiber filled pellets that are molded or extruded to produce a shaped article of manufacture.

In many mass transportation applications (e.g., a train, a tram, a subway, a light rail, a monorail, an aircraft, a helicopter, a bus, a trolley, a ferry, a cable car, and the like.), it is desirable for a structural component or composite to be fire resistant to meet various specifications for fire, smoke, toxicity, and performance. Many countries have various standards for fire resistant materials used in the transportation industry, thus making it difficult to meet all of the standards with a single composite material. This can result in manufactures having to produce different materials for different regions, which can be inefficient from an economic as well as a manufacturing perspective. Examples of these standards include European Union EN-45545-2, American Section for the International Association for Testing Method (ASTM) E662, ASTM E162, Chinese standard TB/T, or the International Union of Railways standard UIC 564.

Various attempts to meet the fire retardant standards include making the components out of aluminum or other fire resistant metals or alloys, or adding fire retardant compositions to wood or particle-board materials. However, these solutions suffer in that the materials add weight to the overall structure.

Various attempts to provide fire resistant light-weight structural components have included using polymeric materials that include halogen plastic materials (e.g., fluorocarbon polymeric material, polyvinyl chloride, or the like). However, these materials suffer in that they can produce toxic, harmful, and undesirable halogen-containing gases and/or may not meet industry standards. Composites made from non-halogen containing polymers, while providing numerous advantages, can suffer in that many are flammable and/or may not provide the mechanical and/or physical properties necessary for the application (e.g., floor panels). By way of example, International Patent Application Publication No. WO 2016/174232 to Van der Mee et al., and WO 2015/051060 to Kenny describe fiber reinforced polymer composites for mass transit vehicles and automotive vehicles, respectively, where the composite is made by umolding polypropylene pellets having glass fiber cores.

While various attempts have been made to produce thermoplastic fire-retardant composites, these attempts have failed to meet the rail transportation industry fire standards and structural standards for mass transit vehicles.

SUMMARY OF THE INVENTION

A discovery has been made that addresses the problems associated with fire-retardant composites used in the mass transportation (e.g., rail transportation) industry. The discovery is premised on a thermoplastic fire-retardant composite having a sandwich-type structure. The sandwich-type structure includes thermoplastic laminates and a thermoplastic core. It was found that such a structure can meet rail transportation industry standards (e.g., fire testing of materials and components for trains standard, which includes EN 45545-2 and structural requirements). Further, the materials used in this structure are light-weight and can avoid the off-gassing issues seen with many of the currently available composites. Additionally, the manufacturing processing steps used to make the composites of the present invention can be economically efficient and scalable for commercial production.

In one aspect of the present invention, fire-retardant composites are described. A fire-retardant composite can include (a) a porous core material, (b) a first fire-retardant laminate disposed on a first side of the porous core; and (c) a second laminate disposed on a side opposite the first side of the core. The second laminate can be the same or different than the first laminate. The porous core can include a first thermoplastic polymer that can include a polyethylene terephthalate, a fire-retardant polypropylene, a polycarbonate, a polyimide, a polyethersulfone, a polyurethane, or a poly(phenylene ether)/styrene blend, or a blend thereof. The first fire-retardant laminate can include at least one ply. The ply can include, based on the total weight of the ply, (i) at least 15 wt. % of a second thermoplastic polymer comprising a polypropylene, a polycarbonate, or a polyimide, or a blend thereof, (ii) 4 to 10 wt. % of a fire-retardant composition, (iii) 50 to 80 wt. % of fibers, and (iv) 0.01 to 2 wt. % of a coupling agent. The fire retardant composition can include a metal oxide (e.g., zinc oxide) and a nitrogen-phosphorous compound (e.g., melamine pyrophosphate, piperazine pyrophosphate, ammonium polyphosphate, and mixtures thereof).

In some embodiments of the present invention, a fire-retardant composite can include: (a) a porous core; (b) a first fire-retardant laminate; (c) optionally, a second laminate disposed on a side opposite the first side of the core; and (d) at least one adherent layer between the first laminate and the core, the optional second laminate and the core, or both. The optional second laminate can be the same or different than the first laminate. The porous core can include polyethylene terephthalate foam. The first fire-retardant laminate can include at least one ply, the ply can include, based on the total weight of the ply: (i) at least 15 wt. %, of a polypropylene, (ii) 4 to 10 wt. % of a fire-retardant composition; (iii) 50 to 80 wt. % of glass fibers; and (iv) 0.01 to 2 wt. % of a coupling agent. The fire retardant composition can include zinc oxide and piperazine pyrophosphate.

In another embodiment of the present invention, fire-retardant laminates having one or more plies are described. A fire-retardant laminate can include, based on the total weight of the ply: (i) at least 15 wt. % of a thermoplastic polymer matrix of a polypropylene, a polycarbonate, or a polyimide, or a blend thereof; (ii) 4 to 10 wt. % a fire-retardant composition (e.g., a metal oxide and a nitrogen-phosphorous compound); (iii) 50 to 80 wt. % of fibers; and (iv) 0.01 to 2 wt. % of a coupling agent.

In the context of the present invention 20 embodiments are described. Embodiment 1 is a fire-retardant composite comprising: (a) a porous core material comprising a first thermoplastic polymer comprising polyethylene terephthalate, a fire-retardant polypropylene, a polycarbonate, a polyimide, a polyethersulfone, a polyurethane, or a poly(phenylene ether)/styrene blend, or a blend thereof; (b) a first fire-retardant laminate disposed on a first side of the porous core, the first fire-retardant laminate comprising at least one ply, the ply comprising: (i) at least 15 wt. %, based on the total weight of the ply, of a second thermoplastic polymer comprising a polypropylene, a polycarbonate, or a polyimide, or a blend thereof; (ii) 4 to 10 wt. %, based on the total weight of the ply, a fire-retardant composition comprising a metal oxide and a nitrogen-phosphorous compound; (iii) 50 to 80 wt. %, based on the total weight of the ply, of fibers; and (iv) 0.01 to 2 wt. %, based on the total weight of the ply, of a coupling agent; and (c) a second laminate disposed on a side opposite the first side of the core, wherein the second laminate is the same or different than the first laminate. Embodiment 2 is the fire retardant composite of embodiment 1, wherein the second thermoplastic polymer is polypropylene. Embodiment 3 is the fire-retardant composite of any one of embodiments 1 to 2, wherein the metal oxide is zinc oxide. Embodiment 4 is the fire-retardant composite of any one of embodiments 1 to 3, wherein the fire-retardant composition further comprises a nitrogen-phosphorous compound selected from the group consisting of melamine pyrophosphate, piperazine pyrophosphate, ammonium polyphosphate, and mixtures thereof. Embodiment 5 is the fire-retardant composite of any one of embodiments 1 to 4, wherein the coupling agent is selected from the group consisting of maleic anhydride grafted polypropylene, maleic anhydride polyethylene, and mixtures thereof. Embodiment 6 is the fire-retardant composite of any one of embodiments 1 to 5, further comprising at least one adherent layer contacting at least a portion of the surface of the porous core material and at least a portion of the surface of at least one of the laminates. Embodiment 7 is the fire-retardant composite of embodiment 6, wherein the adherent layer comprises ethylene vinyl acetate, polypropylene, polypropylene-polyethylene terephthalate blends, acrylics, nitriles, silicone rubbers, styrene-butadiene-styrene copolymers, styrene-ethyl/ene/butyl/ene-styrene copolymers, styrene-ethyl/ene/propylene copolymers, styrene-isoprene-styrene copolymers, or a combination thereof, preferably ethylene vinyl acetate. Embodiment 8 is the fire-retardant composite of any one of embodiments 1 to 7, wherein the core material has an open-cell foam structure, a closed-cell foam structure, a honeycomb structure, or combinations thereof. Embodiment 9 is the fire-retardant composite of any one of embodiments 1 to 8, wherein the fibers comprise glass fibers, carbon fibers, aramid fibers, polyethylene fibers, polyester fibers, polyamide fibers, ceramic fibers, basalt fibers, steel fibers or combinations thereof, preferably glass fibers, and the fibers have an average diameter of 3 to 30 microns. Embodiment 10 is the fire-retardant composite of any one of embodiments 1 to 9, wherein the composite has an average thickness between 1 mm and 100 mm. Embodiment 11 is the fire-retardant composite of any one of embodiments 1 to 9, wherein, the second laminate is the same as the first laminate.

Embodiment 12 is a fire-retardant composite comprising: (a) a porous core comprising a polyethylene terephthalate foam; (b) a first fire-retardant laminate comprising one or more plies, at least one ply comprising: (i) at least 15 wt. %, based on the total weight of the ply, of polypropylene; (ii) 4 to 10 wt. %, based on the total weight of the ply, of a fire-retardant composition comprising zinc oxide and piperazine pyrophosphate; (iii) 50 to 80 wt. %, based on the total weight of the ply, of glass fibers; and (iv) 0.01 to 2 wt. %, based on the total weight of the ply, of a coupling agent; (c) optionally, a second laminate disposed on a side opposite the first side of the core, wherein the second laminate is the same or different than the first laminate; and (d) at least one adherent layer between the first laminate and the core, the optional second laminate and the core, or both. Embodiment 13 is the fire-retardant composite of embodiment of claim 1 or 12, wherein the fire-retardant composite has a four minute smoke density, $D_s$, of less than about 300 as measured by ISO 5659-2 on a 75×75×18 mm thick composite, and a maximum average heat release (MAHRE) of equal to or less than 90 kW/m² measured according to ISO 5660-1:2015 on a 100 mm×100 mm×18 mm thick composite at 25 kW/m².

Embodiment 14 is a fire-retardant laminate comprising one or more ply, at least one ply comprising: (i) at least 15 wt. %, based on the total weight of the ply, of a thermoplastic polymer matrix of a polypropylene, a polycarbonate, or a polyimide, or a blend thereof; (ii) 4 to 10 wt. %, based on the total weight of the ply, of a fire-retardant composition comprising a metal oxide and a nitrogen-phosphorous compound; (iii) 50 to 80 wt. %, based on the total weight of the ply, of fibers; and (iv) 0.01 to 2 wt. %, based on the total weight of the ply, of a coupling agent. Embodiment 15 is the fire-retardant laminate of embodiment 14, wherein the fire-retardant composition is a mixture of zinc oxide and piperazine pyrophosphate. Embodiment 16 is the fire-retardant laminate of any one of embodiments 14 to 15, wherein the fibers are continuous glass fibers. Embodiment 17 is the fire-retardant laminate of embodiment 16, wherein the fibers are glass fibers and substantially all of the glass fibers are continuous unidirectional glass fibers dispersed within the thermoplastic polymer. Embodiment 18 is the fire-retardant laminate of any one of embodiments 14 to 17, wherein the laminate comprises at least 2 plies. Embodiment 19 is the fire-retardant laminate of embodiment 18, wherein the laminate has a first ply having continuous fibers aligned in a first direction; and a second ply having continuous fibers aligned in a second direction that is angularly disposed relative to the first direction, wherein the smallest angle between the first direction and the second direction is from 20 to 90 degrees, preferably 30 to 90 degrees, more preferably 45 to 90 degrees. Embodiment 20 is the fire-retardant laminate of any one embodiments 14 to 19, wherein the laminate has a smoke density, $Ds_{max}$, over the duration of the test, of less than about 300 as measured by ISO 5659-2. In some embodiments, a fire-retardant laminate includes or consists of one or more plys that consists of: (i) at least 15 wt. %, based on the total weight of the ply, of an additized or an unadditized thermoplastic polymer matrix of a polypropylene, a polycarbonate, or a polyimide, or a blend thereof; (ii) 4 to 10 wt. %, based on the total weight of the ply, of a fire-retardant composition that includes a metal oxide and a nitrogen-phosphorous compound; (iii) 50 to 80 wt. %, based on the total weight of the ply, of fibers; and (iv) 0.01 to 2 wt. %, based on the total weight of the ply, of a coupling agent.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1A:
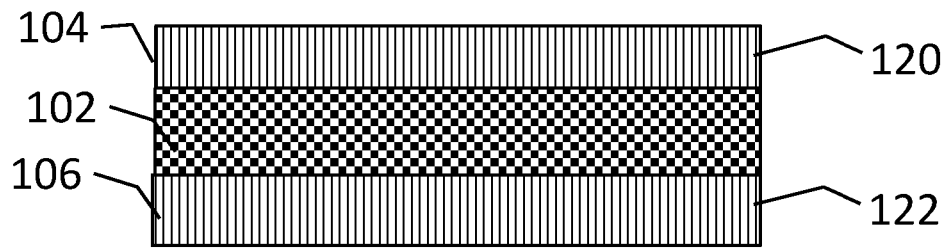
FIG. 1A is an illustration of a cross-sectional view of a fire-retardant composite of the present invention having a sandwich-type structure that includes two thermoplastic laminate and a porous thermoplastic core.

While the invention is susceptible to various modifications and alternative forms, specific embodiments thereof are shown by way of example in the drawings. The drawings may not be to scale.

DETAILED DESCRIPTION OF THE INVENTION

Many thermoplastic components made for the mass transportation industry (e.g., rail industry) fail the fire testing requirements and structural requirements. By way of example, most components made from polypropylene containing polymeric materials fail these tests. A discovery has been found that addresses some the problems associated with conventional reinforced thermoplastic components. The discovery is premised on a fire-retardant thermoplastic composite that can include a laminate having a thermoplastic polymer (e.g., polypropylene) and fire-retardant composition and a porous (e.g., honeycomb or foamed) thermoplastic core. The fire-retardant composite of the present invention can be compliant with interior rail transportation standards (e.g., EN 45545-2; R1, R6, R10 (HL2, HL3), TB/T (TB, TBT), NFPA 130, ASTM E662, ASTM E162, Chinese standard TB/T or the International Union of Railways Standard UIC 564). These and other non-limiting aspects of the present invention are discussed in further detail in the following sections.

A. Fire-Retardant Composite

Figure 1B:
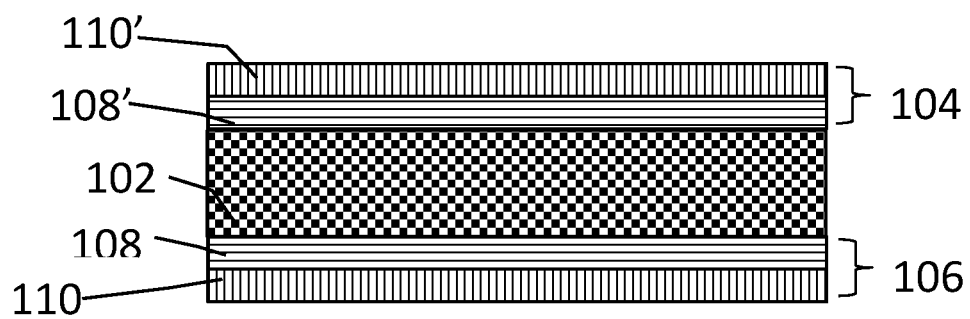
FIG. 1B is an illustration of a cross-sectional view of a fire-retardant composite of the present invention having a sandwich-type structure that includes four plies and a porous thermoplastic core.
Figure 1C:
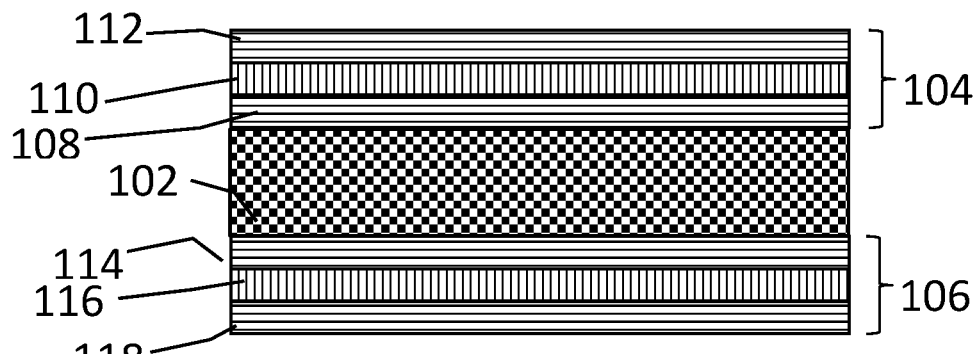
FIG. 1C is an illustration of a cross-sectional view of a fire-retardant composite of the present invention having a sandwich-type structure that includes six plies and a porous thermoplastic core.

The fire-retardant composite of the present invention can have a sandwich-type structure having a thermoplastic core positioned between two thermoplastic laminates. FIGS. 1A-1C are cross-sectional illustrations of fire-retardant composite 100. Referring to FIG. 1A, composite 100 can have porous thermoplastic core 102, first laminate 104, and second laminate 106. While only one laminate is shown, it should be understood that multiple laminates can be used. First laminate 104 and second laminate 106 can be made of one ply or multiple plies (e.g., 1, 2, 3, 4, 5, 6, 7, 8, 9, 10, 11, 11, 12, etc.). FIGS. 1B and 1C depict composite 100 with four plies (plies 108, 108', 110 and 110') and six plies (ply 108, 110, 112, 114, 116, and 118), respectively. One or all of the plies can include fibers 120 dispersed within polymeric matrix material 122 (See, FIG. 1A). It should be understood that the hatching in the plies of figures does not represent direction of the fibers unless indicated otherwise. The compositions of laminate 104 and 106 can be the same or different and is discussed in more detail in Section C below. In a preferred embodiment, laminate 104 and 106 can different compositions, similar compositions, substantially the same, or the same composition.

Figure 2:
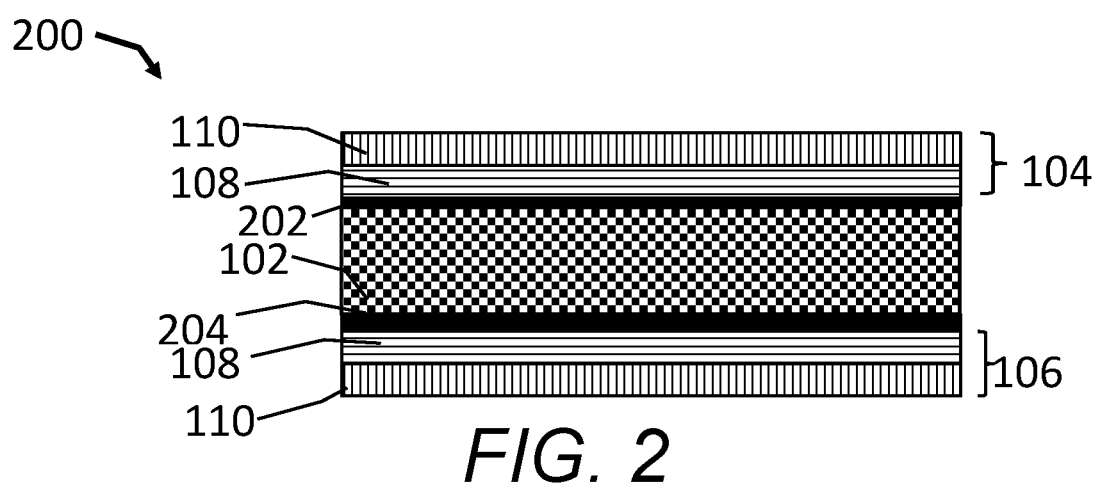
FIG. 2 is an illustration of cross-sectional view of a fire-retardant composite of the present invention having a sandwich-type structure that includes four plies, a porous thermoplastic core and an adherent layer.

In some embodiments, composite 100 can include an adherent layer. The adherent layer can be used to improve the adhesion between plies and/or laminates and the core. FIG. 2 depicts composite 200 that include adherent layers 202 and 204 between laminate 104, laminate 106 and core 102. Adherent layers 202 and 204 can be the same or different adherent composition. In some embodiments, only one adherent layer is used. By way of example, composite 200 can only include adherent layer 202 and not adherent layer 204 (not shown). Adherent layers 202 and 204 can include adherent (adhesive) compositions and other components. Non-limiting examples of adherents include ethylene vinyl acetate, polypropylene, polypropylene-polyethylene terephthalate blends, acrylics, nitriles, silicone rubbers, styrene-butadiene-styrene copolymers, styrene-ethylene/butylene-styrene copolymers, styrene-ethylene/propylene copolymers, styrene-isoprene-styrene copolymers, a combination thereof, or blend thereof. In a preferred instance, ethylene vinyl acetate is used. In another embodiment, no adhesives are used. In some embodiments, the adherent is mixed with other additives including antioxidants, heat stabilizers, flow modifiers, colorants, etc., or any combinations thereof. Adherents and other additives are available from commercial chemical suppliers such as, for example, SigmaMillipore (U.S.A.), ExxonMobil Chemical (U.S.A.), Lyondell-Bassell (U.S.A.), and the like.

The fire-retardant composite can be dimensioned and shaped according to respective applications. The overall thickness of the composite can be up to and even exceeding several millimeters. More specifically, the composite can have a thickness of 1 to 100 mm, 0.4 to 50 mm, 0.6 to 25 mm. The thickness of the composite can vary depending on the desired weight % of each laminate. The thickness of the composite can be obtained by controlling the thickness of the plies used to make the laminate. Composite 100 or 200 can be rectangular; however, other embodiments of the present laminates can be triangular, square, or otherwise polygonal (whether having sharp and/or rounded corners), circular, elliptical, or otherwise rounded, or can have an irregular shape. Some embodiments of the present composites can include one or more openings, notches, and/or the like, which can facilitate incorporation of the composite into a structure.

In some embodiments, the composite and/or laminates can be decorated. In use, a surface of the composite or laminates can be subjected to printing with ink. In an embodiment, an exposed surface of the composite or a laminate surface opposite the surface adjacent to the core can be subsequently decorated, in particular printed with markings such as alphanumerics, graphics, symbols, indicia, logos, aesthetic designs, multicolored regions, and a combination that includes at least one of the foregoing. In some embodiments, each ply can be decorated. In some embodiments, one of the exposed (or outer) surfaces of the composite can be subjected to common curing and/or surface modification processes. Non-limiting examples of such processes can include heat-setting, texturing, calendaring, embossing, corona treatment, flame treatment, plasma treatment, and vacuum deposition.

In some embodiments, the composite can include a cap layer material. The cap layer can be a film laminate made from a different polymer and process than the composite laminates. By way of example, it can be an extruded film material, which is, for example, chemical resistant to cleaning agents. Film materials used can include polyvinylidene fluoride (PVDF), polyvinyl fluoride (PVF), poly(methylmethacrylate) (PMMA), multilayered combinations and blends thereof. These film materials can be applied by roller lamination or double belt press lamination equipment. Also aesthetic film materials can be used to produce, for example, a wood grain or metallic surface. The cap layer can be created by co-extrusion (single or multi-manifold). In some embodiments, an anti-microbial surface can be created by co-extrusion of film materials with silver. In some embodiments, the cap layer can be made by screen-printing an aesthetic or functional ink layer. In most instances, these cap layers will be thermoformable.

Figure 3:
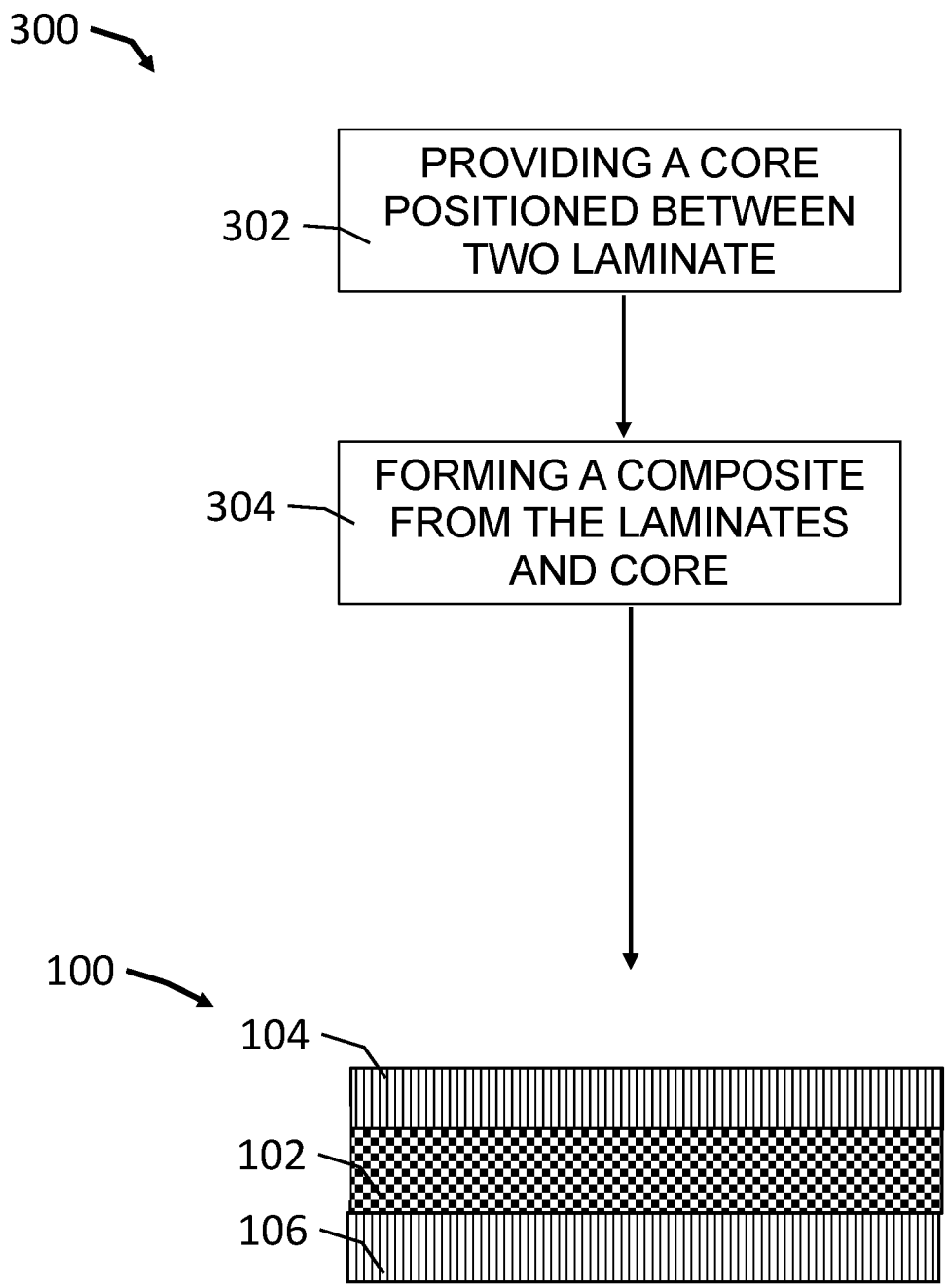
FIG. 3 is a flow chart of a method to make a sandwich-type composite of the present invention from two laminates and a porous thermoplastic core.
Figure 4:
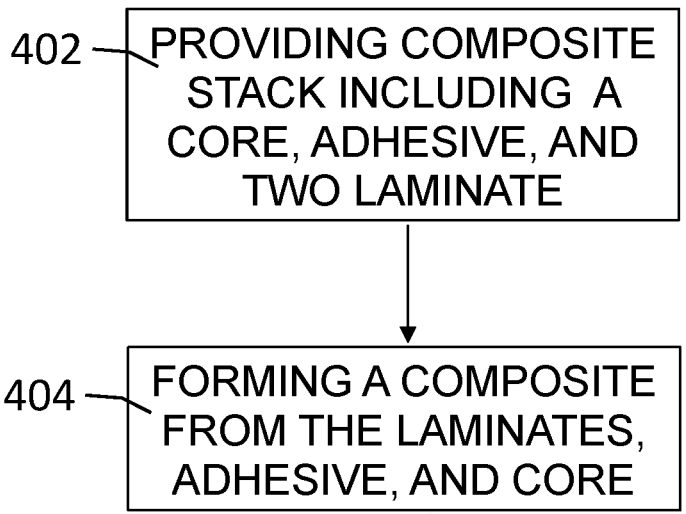
FIG. 4 is a flow chart of a method to make a sandwich-type composite of the present invention having two laminates, a porous thermoplastic core, and two adherent layers.
Figure 4:
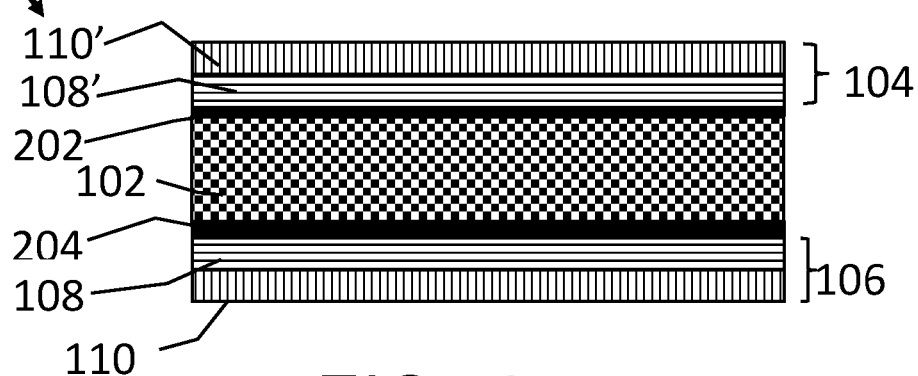

The fire-retardant composites (e.g., composites 100 and 200 in FIGS. 1 and 2) can be made using known panel consolidation techniques. By way of example, the fire-retardant composite can be made using continuous systems that include one or more machines capable of cutting, cooling, stacking, wrapping, or the like (for example, static heated presses, double belt presses and the like). FIGS. 3 and 4 are flow charts of methods to prepare fire-retardant composites 100 (FIG. 3) and 200 (FIG. 4). In step 302 of method 300, laminates 104, 106 and porous thermoplastic core 102 can be obtained. In some embodiments, the laminates can be include at least 2 or 3, 4, 5, 6, 7, 8, 9, 10 or more plies having a thickness of about 0.1 to 10 mm, or 0.25 to 5 mm. In some embodiments, the core density can be reduced to a desired density by patterning the core thermoplastic layer. Porous thermoplastic core 102 can be positioned between the two laminates. In step 304, the composite stack can be formed by heating and pressing the laminates and core together. By way of example the composite stack can enter a first zone of a double belt press at a pressure of 5 to 15 $N/cm^2$, or (0.5 to 1.5 MPa, or 0.5, 0.6, 0.7, 0.8, 0.9, 1, 1.1, 1.2, 1.3, 1.4, 1.5 MPa or any value or range there between) and then heated to a temperature of 140 to 150° C., (e.g., about 145° C.). The pressed stack can enter a second zone, be pressed, and the heated to 145 to 155° C. (e.g., about 150° C.). The pressed stack can enter a third zone, be pressed and then heated at a temperature of 150 to 160° C. (e.g., about 155° C.) to form the composite 100. In some embodiments, laminates 104 and 106 fully encapsulate core 102 after heat pressing.

In method 400, laminates 104, 106, core 102, and an adhesive can be obtained in step 402. In some embodiments, the core density can be reduced to a desired density by patterning the core thermoplastic layer. Core 102 can be positioned between the two laminates with adhesive being between at least one surface of the core and a laminate. In some embodiments, the surface of core 102 can be treated with the adherent prior to assembling the stack. In step 404, the composite stack can be formed by heating and pressing the laminates, adhesive and core together. By way of example, the composite stack can enter a first zone of a double belt press at a pressure of 5 to 15 $N/cm^2$, or (0.5 to 1.5 MPa, or 0.5, 0.6, 0.7, 0.8, 0.9, 1, 1.1, 1.2, 1.3, 1.4, 1.5 MPa or any value or range there between) and then heated to a temperature of 140 to 150° C., (e.g., about 145° C.). The pressed stack can enter a second zone, be pressed, and the heated to 145 to 155° C. (e.g., about 150° C.). The pressed stack can enter a third zone, be pressed and then heated at a temperature of 150 to 160° C. (e.g., about 155° C.) to form the composite 200. In some embodiments, laminates 104 and 106 fully encapsulate core 102 after heat pressing.

The composites of the present invention can be used in transportation components. Non-limiting examples of transportation components can include floor panels, claddings, covers, and tray tables for train interiors. Non-limiting examples of claddings include: interior vertical surfaces, such as side walls, front walls, end-walls, partitions, room dividers, flaps, boxes, hoods and louvres; interior doors and linings for internal and external doors; window insulations; kitchen interior surfaces; interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens) and the like.

While the compositions described herein are designed for use preferably in railway interiors, it is to be understood that the compositions are also useful in other interior components that are required to meet the fire retardant test standards for rail applications. By way of example, the components can be used for interior bus articles of manufacture such as floor panels, claddings, covers, tray tables, and the like as described above.

B. Core Material

The porous thermoplastic core (See, for example core 102 in FIGS. 1 and 2) can have an open-cell foam structure, a closed-cell foam structure, a honeycomb structure, or combinations thereof. In some embodiments, the porous thermoplastic core has a honeycomb structure that is filled with foamed thermoplastic material. The density of the core can be greater than or substantially equal to any one of, or between any two of: 20, 25, 50, 75, 100, 125, 150, 175, 200, 225, 250, 275, 300, 325, 350, 357, and 400 Kgm$^{-3}$. Polymers used for sandwich panel core 102 can be linear (non-crosslinked), partially crosslinked or fully crosslinked depending on the final application. Crosslinking of core material can be done during core manufacturing or be an additional processing operation. Core materials can include additional fillers and/or fire-retardant compositions. Fillers can include fiber or particles such as, for example, polytetrafluoroethylene (PTFE) nano-fibrillated fibers, inorganic fiber-particles, and the like. The amount and composition of the filler can include halogenated materials as long as the materials are not detrimental to the overall performance of the composite.

Core materials can include a polyethylene terephthalate (PET), a fire-retardant polypropylene (PP), a polycarbonate (PC), a polyimide, a polyethersulfone (PES), a polyurethane (PU), or a poly(phenylene ether)/styrene blend, or a blend thereof "Polypropylene" as used herein includes polypropylene and co-polymers thereof "Polycarbonate polymers" as used herein include polycarbonate polymers and co-polymers thereof and are described in more detail below. "Polyimides" as used herein include polyimides and polyetherimides. Thermoplastic cores can be produced or are available from various commercial sources. By way of example, a PET core can be obtained from commercial sources such as Armacell Benelux S.A. (Beligum) under the tradename of ArmaFORM®, or from Diab Group (Sweden) under the tradename of Divinylcell P. In a preferred embodiment, the core is a PET foam. Fire-retardant polypropylene honeycomb cores can be obtained from EconCore N.V. (Belgium.) under the tradename ThermHex. Polyimide cores can be obtained from commercial suppliers such as DuPont™ (U.S.A.), Hexcel Corporation (U.S.A.), and the like.

Polycarbonate polymers suitable for use in the present disclosure can have any suitable structure. For example, such a polycarbonate polymer can include a linear polycarbonate polymer, a branched polycarbonate polymer, a polyester carbonate polymer, or a combination thereof. Such a polycarbonate polymer can include a polycarbonate-polyorganosiloxane copolymer, a polycarbonate-based urethane resin, a polycarbonate polyurethane resin, or a combination thereof. The polycarbonate polymer can include an aromatic polycarbonate resin. For example, such aromatic polycarbonate resins can include the divalent residue of dihydric phenols bonded through a carbonate linkage and can be represented by the formula:

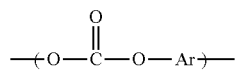

where Ar is a divalent aromatic group. The divalent aromatic group can be represented by the formula: —Ar$_1$—Y—Ar$_2$—, where Ar$_1$ and Ar$_2$ each represent a divalent carbocyclic or heterocyclic aromatic group having from 5 to 30 carbon atoms (or a substituent therefor) and Y represents a divalent alkane group having from 1 to 30 carbon atoms. For example, in some embodiments, —Ar$_1$—Y—Ar$_2$— is Ar$_1$—C(CH$_3$)—Ar$_2$, where Ar$_1$ and Ar$_2$ are the same. As used herein, "carbocyclic" means having, relating to, or characterized by a ring composed of carbon atoms. As used herein, "heterocyclic" means having, relating to, or characterized by a ring of atoms of more than one kind, such as, for example, a ring of atoms including a carbon atom and at least one atom that is not a carbon atom. "Heterocyclic aromatic groups" are aromatic groups having one or more ring nitrogen, oxygen, or sulfur atoms. In some embodiments, An and Ar$_2$ can each be substituted with at least one substituent that does not affect the polymerization reaction. Such a substituent can include, for example, a halogen atom, an alkyl group having from 1 to 10 carbon atoms, an alkoxy group having from 1 to 10 carbon atoms, a phenyl group, a phenoxy group, a vinyl group, a cyano group, an ester group, an amide group, or a nitro group. Aromatic polycarbonate resins suitable for use in the present disclosure can be commercially available, such as, for example, Lexan® HF1110, available from SABIC Innovative Plastics (U.S.A.), or can be synthesized using any method known by those skilled in the art. Polycarbonate polymers for use in the present disclosure can have any suitable molecular weight; for example, an average molecular weight of such a polycarbonate polymer can be from approximately 5,000 to approximately 40,000 grams per mol (g/mol).

C. Laminates

One or multiple plies can include a thermoplastic polymer, a fire retardant composition, fibers, and a coupling agent. Thermoplastic polymers suitable for use in making the first or second laminate can include thermoplastic polymers that are the same or different from the thermoplastic polymers used for the core. Non-limiting examples of thermoplastic polymers include a polypropylene, a polycarbonate (described above), or a polyimide (described above), or a blend thereof. In a preferred embodiment, the ply includes polypropylene, more specifically polypropylene homopolymer. Polypropylene can be obtained from various commercial suppliers. Non-limiting examples of commercial polypropylene include Achieve™ 6936G2 resin by ExxonMobil (U.S.A.), Braskem CP1220B by Songhan Plastic Technology Co., Ltd. (China), Moplen HP500V by LyondellBasell Industries Holding, B.V. (the Netherlands), PP FPC100 by SABIC® (Saudi Arabia), and the like. In some embodiments, the polypropylene can be a high flow polypropylene, which has a melt flow rate of 210 to 240 or about 230° C./2.16 Kg as determined by ISO 1133 at about 120 g/10 min). Polyimides can be obtained from commercial suppliers such as RTP Co. (U.S.A.), DuPont™ (U.S.A.), or the like. In some embodiments, a ply includes greater than or substantially equal to any one of, or between any two of: 15, 16, 17, 18, 19, 20, 21, 22, 23, 24, 25 wt. % of polymer, based on the total weight of the ply.

The fire-retardant composition can include or more compounds known to inhibit or delay the spread of fire and/or reduce the flammability of the composition. In a particular embodiment, the fire-retardant composition is an intumescent fire-retardant, which inhibits or delays the spread of a fire. Non-limiting examples of fire-retardants include nitrogen-phosphorus compounds, phosphoric acid, metal oxides, organo-phosphorus compounds, nitrogen-containing polymers, talc, sulfonates or salts thereof, halogen-containing compounds, silica, hydrated oxides, organic polymers, nanoclays, organoclay, organic polymers, silicon-phosphorous-nitrogen compounds, and mixtures thereof. Non-limiting examples of nitrogen-phosphorus fire-retardant compounds include a nitrogen-containing phosphate, a nitrogen-containing polyphosphate, ammonium phosphate, ammonium pyrophosphate, piperazine pyrophosphate, piperazine polyphosphate, melamine pyrophosphate, or a combination thereof. The term "phosphate" refers to a salt or ester of a phosphoric acid. The term "pyrophosphate" refers to phosphate $PO_4$ structural units linked together by an oxygen atom. The term "polyphosphate" refers to a salt or ester of a polymeric oxyanion formed from three of more phosphate ($PO_4$) structural units linked together by sharing oxygen atoms. Nitrogen-phosphorus fire-retardant compounds and/or compositions are described in U.S. Pat. No. 7,803,856 to Perego et al., U.S. Patent Application Publ. Nos. 2013/0248783 to Zhu et al., and 2016/0244600 to Kurokawa, or can be obtained from commercial sources such as Adeka Palmarole (Japan) under the tradenames ADK STAB FP-2100JC, ADK STAB FP-2200S and ADK STAB FP-2500S. Non-limiting examples of metal oxides include zinc oxide, magnesium oxide, iron oxide, titanium dioxide. In a preferred embodiment, zinc oxide is used. Non-limiting examples of nitrogen-containing polymers include poly(2, 4-piperazinyl-6-morpholinyl-1,3,5-triazine), poly(2,4-piperazinyl-6-morpholinyl-1,3,5-triazine). Non-limiting examples, of phosphorus fire-retardants includes resorcinol bis(diphenyl phosphate), bisphenol A bis(diphenyl phosphate), triphenyl phosphate, tricresyl phosphate, phosphoric acid derivatives, and the like. In one embodiment, the ply can include a metal oxide (e.g., zinc oxide) and a nitrogen-phosphorous compound. The nitrogen-phosphorous compound can be at least one of melamine pyrophosphate, piperazine pyrophosphate, and ammonium polyphosphate. The total amount of fire-retardant composition in the ply can be 4 to 10 wt. %, preferably 5 to 9 wt. %, or greater than or substantially equal to any one of, or between any two of: 4, 4.5, 5, 5.5, 6, 6.5, 7, 7.5, 8, 8.5, 9, 9.5, or 10 wt. %. In one embodiment, the ply contains 4 to 10 wt. % of the fire-retardant composition that includes a metal oxide and a nitrogen-phosphorous compound. By way of example, the ply can include 4 to 10 wt. % (or about 6 wt. %), based on the total weight of the ply, of the fire-retardant composition that includes zinc oxide and piperazine pyrophosphate. The thermoplastic polymer composition (e.g., second thermoplastic polymer) used to make the ply can include 5 wt. % to 30 wt. %, preferably 10 wt. % to 25 wt. % or 15 wt. % to 20 wt. % or greater than or substantially equal to any one of, or between any two of 5, 10, 15, 20, 25, and 30 wt. %. of the fire-retardant composition, based on the total weight of the thermoplastic polymer composition.

Non-limiting examples of fibers include glass fibers, carbon fibers, aramid fibers, polyethylene fibers, polyester fibers, polyamide fibers, ceramic fibers, basalt fibers, steel fibers, and/or the like. The ply can include, based on the total weight of the ply, 50 to 80 wt. % fibers or greater than or substantially equal to any one of, or between any two of: 50, 55, 60, 65, 70, 75, 80 wt. % fibers. Fibers (e.g., 120) of a composite (e.g., 100 and/or 200) may be provided in bundles (e.g., bundles of carbon, ceramic, carbon precursor, ceramic precursor, glass, and/or the like fibers). Such bundles may include any number of fibers, such as, for example, 400, 750, 800, 1,375, 1,000, 1,500, 3,000, 6,000, 12,000, 24,000, 50,000, 60,000, or more fibers. Fibers in a bundle can have an average filament diameter of 5, 6, 7, 8, 9, 10, 11, 12, 13, 14, 15, 16, 17, 18, 19, 20, 21, 22, 23, 24, 25, or more microns (e.g., from 5 to 30 microns, 10 to 20 microns, 12 to 15 microns, or any range there between). Fibers can be provided with a coating (e.g. a coating of an organic polymer, such as an organosilane), a pigment, and/or the like. Fibers can also be provided as a woven mat.

Coupling agents can include maleic anhydride grafted polyethylene, maleic anhydride grafted polypropylene, or a combination that includes at least one of the foregoing. The ply can include, based on the total weight of the ply, 0.1 to 2 wt. % coupling agent or greater than or substantially equal to any one of, or between any two of: 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 wt. % of coupling agent.

In some embodiments, ply can optionally include additives such as antioxidants, heat stabilizers, flow modifiers, colorants, etc., or any combinations thereof. An amount of additives range from 0.01 to 0.1 wt. %, or 0.01, 0.02, 0.03, 0.04, 0.05, 0.06, 0.07, 0.08, 0.09, or 0.1 wt. % or any range or value there between.

In a preferred embodiment, one ply or multiple plies can include, based on the total weight of the ply, at least 15 wt. % of polypropylene, 4 to 10 wt. %, a fire-retardant composition that includes zinc oxide and piperazine pyrophosphate, 50 to 80 wt. % of glass fibers, and 0.01 to 2 wt. % of a coupling agent.

Plies used to produce the laminates can be obtained from commercial sources or manufactured. By way of example, one or more of the plies can be made by dispersing fibers in a polymer matrix as described in International Application Publication No. WO 2016/142786 to Prins et al., which is incorporated by reference in its entirety. In such a method, a sheet or film that includes thermoplastic polymer and/or the fire-retardant composition can be supplied between a first and a second spreaded fiber layers. Heat can be applied to the fiber layer/polymer composition/fiber layer material, followed by pressing the fiber layers into the polymer composition. In some embodiments, after pressing is completed, the first or second fiber layers can be rubbed. In some embodiments, the fibers are not spread prior to heating. In another embodiment, the plies can be made by using known impregnation techniques. For example, Miller et al. in Polymers & Polymer Composites, 1996, Vol. 4, No. 7 describes impregnation techniques for thermoplastic matrix composites, which is incorporated by reference in its entirety. One such method can include providing suppling fibers to one or more solution baths (e.g., thermoplastic polymer and/or fire retardant composition in one or two baths) to form resin impregnated fibers, drying the fibers, and then pressing the fibers to produce a ply (e.g., prepreg sheets). In another embodiment, the polymer and fibers can be stacked together, heated, and then pressed causing the resin to flow transverse to the fibers to from prepreg sheets of reinforced thermoplastic materials.

Each of the plies can have a length and a width that is perpendicular to and smaller than the length, where the length and the width are each a distance between outer edges of the ply measured along a straight line. The length can be, but need not be, the largest such distance. Each of the plies can have a shape and dimensions that correspond to the shape and dimensions of laminate 104 or 106 and/or composite 100 and 200. To further illustrate, the largest face of each of the plies can have a surface area that is substantially equal to a surface area of the largest face of laminate 104 or 106. To yet further illustrate, each of the plies can be rectangular. In other embodiments, one or more plies of a laminate can have a shape and/or dimensions that differ from the shape and/or dimensions of the laminate; such plies can, for example, be used to add stiffness and strength to a portion of the laminate that is smaller than the entirety of the laminate.

Referring back to FIGS. 1B and 1C composites 100 with four plies (plies 108, 108', 110 and 110') and six plies (ply 108, 110, 112, 114, 116, and 118), respectively are depicted. At least one ply can include a thermoplastic fire-retardant polymeric matrix having a plurality of fibers dispersed therein. Some embodiments of the present methods include producing a laminate (e.g., 104 or 106) at least by stacking two or more plies (e.g., including one or more of any plies described above in a 0/90 orientation). By way of example, at least 2 or 3, 4, 5, 6, 7, 8, 9, 10 or more plies having a thickness of about 0.1 to 10 mm, or 0.25 to 5 mm can be stacked. During such stacking, any number of the laminates can be formed by placing sections (e.g., plies 108 and 110) of ply material, such as, for example, sections of unidirectional fiber plies, adjacent to one another. In some methods, the two or more plies include two or more unidirectional first ply and one or more unidirectional second ply, and the stacking is performed such that: (1) fibers of the first ply are aligned in a first direction; (2) fibers of the one or more second ply are aligned in a second direction that is perpendicular to the first direction; and (3) the one or more second plies are disposed in contact with one another and between two of the first plies.

Plies (e.g., 108, 108', 110, 110', 112, 114, 116, 118, etc.) that include fibers (e.g., fibers 120) can have a pre-consolidation fiber volume fraction ($V_f$) that is greater than or substantially equal to any one of, or between any two of: 40, 45, 50, 55, 60, 65, 70, 75, 80, 85, or 90%. In some embodiments of the present laminates, one or more plies may not include fibers; such ply can, for example, include a sheet of thermoplastic polymer material (e.g., polymer 122 in FIG. 1).

The laminates can be prepared using known lamination methods. It should be understood that laminates (e.g., laminates 104 and 106) can be made of plies having the same or different compositions. By way of example, ply 108, ply 110, and ply 112 can each have a different composition or plies 108, 110, 112, 114, 116 and 118 can have the same or different compositions. In another example, laminate 104 can be made of multiple plies where each ply have the same composition, while laminate 106 can be made of multiple plies where each ply have a composition different than the ply that make up laminate 104.

One or all of the plies (e.g., 108, 108', 110, 110', 112, 114, 116, 118, etc.) can include fibers (e.g., fibers 120) dispersed within a matrix material or pressed into the polymer matrix material. By way of example, the laminates can be prepare using a double belt press with integrated contact heating and cooling supplied by, for example Meyer® (Maschinenfabrik, Herber Meyer GmbH, Germany). The different plies (e.g., plies 108 and 110) can enter the heat press unit in a defined stacking sequence at a rate of 1.5 m/min. The ply stack can be pressed together in a first zone at a pressure of 0.1 to 0.4 N/cm², or (1 to 4 kPa, or 1, 1.5, 2, 2.5, 3, 3.5, 4 kPa or any value or range there between) and then heated to a temperature of 170 to 185° C., (e.g., about 180° C.). The pressed stack can enter a second zone, pressed, and the heated to 190 to 200° C. (e.g., about 195° C.). The pressed stack can enter a third zone, be pressed at a lower temperature of 185 to 195° C. (e.g., about 190° C.) to form the laminate (e.g., laminate 104 and/or 106). Heating and cooling can be maintained without release of pressure. In some embodiments, a static heated press can be used.

In laminate 104 and/or 106, each of plies (e.g., plies 108, 108', 110, 110', 112, 114, 116, 118, etc.) can be a unidirectional ply, or a ply having fibers (e.g., fibers 120), substantially all of which are aligned in a single direction. More particularly, in each of the plies, the fibers can be aligned with either the length of laminate 104/106 (e.g., plies 110, 110' of FIG. 1B each of which may be characterized as a 0-degree unidirectional ply) or the width of the laminate (e.g., plies 108 and 108' of FIG. 1B each of which may be characterized as a 90-degree unidirectional ply). The phrase, "aligned with" means within 10 degrees of parallel. Other embodiments of the present laminates can include one or more unidirectional plies, each having fibers that are aligned in any suitable direction. For example, a unidirectional ply can include fibers aligned in a direction, where the smallest angle between the direction and a length of a laminate including ply can be greater than or substantially equal to any one of, or between any two of: 0, 5, 10, 15, 20, 25, 30, 35, 40, 45, 50, 55, 60, 65, 70, 75, 80, 85, or 90 degrees.

Some embodiments of the present laminates can include one or more plies, each having fibers that define a woven structure (e.g., as in a ply having a plane, twill, satin, basket, leno, mock leno, or the like weave). For example, a ply can include a first set of fibers aligned in a first direction and a second set of fibers aligned in a second direction that is angularly disposed relative to the first direction, where the first set of fibers is woven with the second set of fibers. A smallest angle between first direction and second direction can be greater than or substantially equal to any one of, or between any two of: 10, 15, 20, 25, 30, 35, 40, 45, 50, 55, 60, 65, 70, 75, 80, 85, or 90 degrees. The smallest angle between first direction and a length of a laminate including such a ply can be greater than or substantially equal to any one of, or between any two of: 0, 5, 10, 15, 20, 25, 30, 35, 40, 45, 50, 55, 60, 65, 70, 75, 80, 85, or 90 degrees.

Some embodiments of the present laminates can include one or more plies, each formed from sections of ply material. For example, a unidirectional ply can be formed from sections of unidirectional fiber material that has been placed adjacent to one another. To form such a ply, sections of ply material can be placed adjacent to one another manually and/or by an automated material laying machine.

Referring to FIG. 1C, 0-degree unidirectional plies and 90-degree unidirectional plies can be stacked such that the 0-degree unidirectional plies are in contact with one another (meaning each is in contact with at least one other) and are disposed between two of the 90-degree unidirectional plies. In some embodiments, laminates 104 and 106 can include first and second sub-stacks of 90-degree unidirectional plies and a third sub-stack of 0-degree unidirectional plies, where the third sub-stack is disposed between the first and second sub-stacks. In laminates 104 and 106, each of the sub-stacks can include three plies. However, in other embodiments, such sub-stacks can each be replaced with a single ply or can include 2, 3, 4, 5, 6, 7, 8, 9, or more plies. Other embodiments of the present laminates can include any suitable plies (e.g., including one or more of any ply described above) stacked in any suitable configuration (e.g., balanced, symmetric, asymmetric, and/or the like).

D. Compliance Standards

The composites, laminates and/or plies of the present invention can be compliant with rail transportation standards. (e.g., EN 45545-2; R1, R6, R10 (HL2, HL3), TB/T (TB, TBT), NFPA 130, ASTM E662 and ASTM E162, Chinese standard TB/T or the International Union of Railways standard UIC 564). In an embodiment, the non-structural components meet certain criteria set forth in European Railway standard EN-45545 (2013). The European Union has approved the introduction of a set of fire testing standards for the railroad industry that includes flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement" categories for materials have been established (R1-R26). The R1, R2, R5, R10, R11 cover, among others, interior vertical surfaces, such as side walls, front walls, end-walls, partitions, room dividers, flaps, boxes, hoods and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk, interior surfaces of gangways, such as interior sides of gangway membranes (bellows) and interior linings; window frames (including sealants and gaskets), tables(folding) with downward facing surface; interior and exterior surface of air ducts, and devices for passenger information (such as information display screens) and the like. The composites, laminates, and/or plies of the present invention can meet the requirements for HL2 for R1 applications. R6, R8 and R16 cover interior surface of gangways, external body shell (wall and underframe) external exterior ducts, external design features, outer surface of water containers placed in the underframe, bogie part, air bags for pneumatic suspension, cable containment for exterior, arc splash barrier materials, parts of the drive, tires, flexible metal/rubber unit including element in bogies.

The composites, laminates, and/or plies of the present invention can be used meet NFPA 130 (2010 edition) for interior applications used in the United States rail transportation vehicles. This standard imposes requirements on rate of smoke generation and surface flammability. The generation of smoke is measured via ASTM E662-12 smoke density test and the requirements are a preferred smoke density after 1.5 min (Ds 1.5) of 100 and less and a preferred smoke density after 4 min (Ds 4) of 200 and less, in either flaming or non-flaming mode. Surface flammability is measured via the ASTM E162-12a flame spread test and the requirements are a maximum flame spread index (Is) of 35 and less, and no flaming running or dripping allowed. It is calculated from multiplying the flame spread factor (Fs) and the heat evolution factor (Q) determined during the test. The railway components described herein can also meet these standards.

In one embodiment, the fire-retardant composite has a four minute smoke density, $D_s$, of less than about 300 as measured by ISO 5659-2 on a 75×75×18 mm thick composite, and a maximum average heat release (MAHRE) of equal to or less than 90 kW/m² measured according to ISO 5660-1:2015 on a 100 mm×100 mm×18 mm thick composite at 25 kW/m². In another embodiment, one or all of the laminates have a four minute smoke density, $D_s$, of less than about 300 as measured by ISO 5659-2.

All references cited herein are hereby completely incorporated by reference to the same extent as if each reference were individually and specifically indicated to be incorporated by reference and were set forth in its entirety herein.

The following includes definitions of various terms and phrases used throughout this specification.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The fire-retardant composites of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the thermoplastic fire-retardant composites of the present invention are their abilities to be compliant with respect to interior rail transportation fire-retardant standards.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Fire-Retardant Laminates

The fire-retardant plies were made from a resin composition of polypropylene (79.8 wt. %), a nitrogen-phosphorus fire retardant (20 wt. %) and the balance being stabilizers (0.2 wt. %). The resin was formed into plies having a composition of the polypropylene (23.22 wt. %), the nitrogen-phosphorus fire retardant (5.82 wt. %), stabilizers (0.06 wt. %), glass fibers (70 wt. %) and coupling agent (0.9 wt. %). The plies were made into 3, 5 and 7 ply laminates listed in Table 1 using a double belt press manufactured by Meyer® (Maschinenfabrik, Herber Meyer GmbH, Germany). The double belt press parameters were 1.5 m/min, zone 1 temperature about 180° C., zone 2 temperature about, 195° C., zone 3 temperature 190° C., pressure 0.3 N/cm² (3 kPa).

TABLE 1

| Sample No. | Laminates description |
|---|---|
| 1 | 3 plies; orientation 0/90. |
| 2 | 5 plies; orientation 0/90. |
| 3 | 7 plies; orientation 0/90 |

Example 2

Fire-Retardant Testing of Laminates of the Present Invention

Compliancy tests for the rail transportation industry was performed according to EN 45545-2, categories R1 and R10 on the samples 1-3 listed in Table 1.

R1 Category.

R1 category related to railcar interior parts such as ceiling and side walls and includes the tests listed below. Table 2 lists the test results on Samples 1-3 conducted according ISO 5659-2 Smoke density, R1, HL2.
1. ISO 5659-2 Smoke density (50 kW/m2, No Pilot flame) (Ds4<150, HL3; Ds4<300, HL2).
2. ISO 5658-2 Surface flammability. Flame spread.
3. ISO 5660 Cone calorimeter.

TABLE 2

| Sample No. | Length (mm) | Width (mm) | Thickness (mm) | Volume (mm³) | Weight (g) | Density (kg/m³) | Smoke Density Test (50 kW/m², no Pilot flame, R1, HL2) |
|---|---|---|---|---|---|---|---|
| 1 | 75.6 | 76.3 | 0.83 | 4788 | 7.74 | 0.00162 | 233 |
| 2 | 74.5 | 74.5 | 1.31 | 7271 | 11.44 | 0.00157 | 258 |
| 3 | 75.9 | 75.1 | 1.62 | 9234 | 15.03 | 0.00163 | 233 |

R10 Category.

R10 category related to railcar floor panels and includes the tests listed below. Table 3 lists the test results on Samples 1-3 conducted according ISO 5659-2 Smoke density, R10.
1. ISO 9239-1 Reaction to fire tests for floorings
2. ISO 5659-2 Smoke density (Ds4<150, HL3; Ds4<300, HL2)
3. ISO 5660-1 Cone calorimeter

TABLE 3

| Sample No. | Length (mm) | Width (mm) | Thickness (mm) | Volume (mm³) | Weight (g) | Density (kg/m³) | Smoke Density Test (25 kW/m², with Pilot flame, R10, HL2) |
|---|---|---|---|---|---|---|---|
| 1 | 76.2 | 75.3 | 0.83 | 4762 | 7.72 | 0.00162 | 56 |
| 2 | 77.2 | 74.6 | 1.28 | 7372 | 11.78 | 0.0016 | 77 |
| 3 | 74.7 | 76.4 | 1.62 | 9245 | 15.09 | 0.00163 | 76 |

From the data, it was determined that the 3, 5 and 7 ply laminates (Samples 1-3) passed the smoke density HL2 tests of R1 and R10 categories of the EN 45545-2 standard.

Example 3

Fire-Retardant Composites

Figure 5:
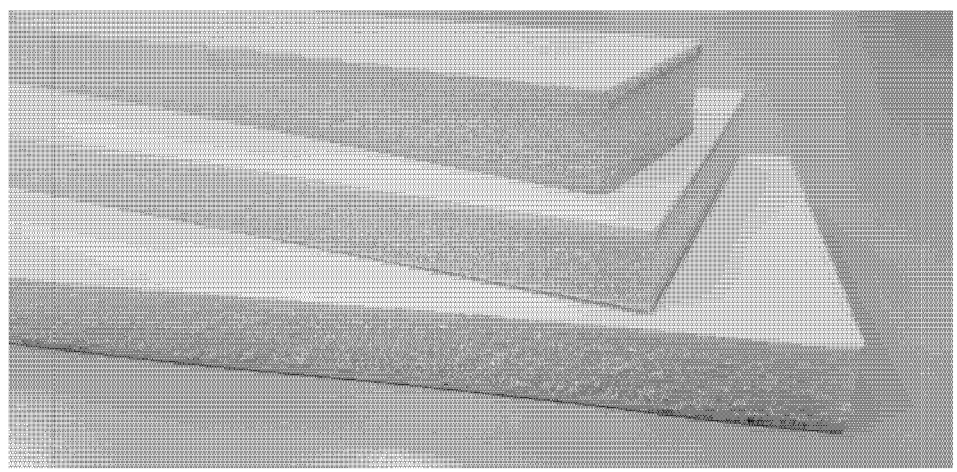
FIG. 5 is an image of the fire-retardant composite of the present invention.

The fire-retardant laminates of Example 1 were consolidated with a PET foam core (15 mm, Divinylcell P; Diab Group, Sweden) and a heat curable ethyl vinyl acetate copolymer adhesive (PHOTOCAP® 15580P, STR Holding, Inc. U.S.A.). The composites were made using a double belt press manufactured by Meyer® (Maschinenfabrik, Herber Meyer GmbH, Germany). The double belt press parameters were 0.5 m/min, zone 1 temperature about 145° C., zone 2 temperature about, 150° C., zone 3 temperature 155° C., pressure 10 N/cm² (100 kPa). Table 4 lists the composites made. FIG. 5 is an image of composite Samples 4, 5, and 6.

TABLE 4

| Sample No. | Sandwich Panel Composites Description |
|---|---|
| 4 | Two 3 ply (0-90-0) laminates; PET core |
| 5 | Two 5 ply (0-90-0-90-0) laminates; PET core |
| 6 | Two 7 ply (0-90-0-90-0) laminates; PET core |
| 7 | Two 8 ply (0-90-90-0-90-0) laminates; PET core |
| 8 | Two 5 ply (0-0-90-0-0) laminates; PET core |

Example 4

Fire-Retardant Testing of Sandwich Panel Composites of the Present Invention

Compliancy tests for the rail transportation industry standards was performed according to EN 45545-2, categories R1 and R10 on the samples 4-8 listed in Table 4.

R10 Category.

R10 category testing was performed on composite samples 4-8. Table 5 lists the test results on Samples 4-8 conducted according to ISO 5659-2 Smoke density Ds4<300, HL2, category R10.

TABLE 5

| Sample No. | Length (mm) | Width (mm) | Thickness (mm) | Volume (mm³) | Weight (g) | Density (kg/m³) | Smoke Density Test (25 kW/m², with Pilot flame, R10) |
|---|---|---|---|---|---|---|---|
| 4 | 76.1 | 74.9 | 17.0 | 96898 | 30.5 | 315 | 150 |
| 5 | 76.2 | 74.8 | 17.8 | 101456 | 39.4 | 388 | 207 |
| 6 | 75.2 | 75.8 | 18.7 | 106593 | 50.7 | 476 | 231 |
| 7 | 75.0 | 75.0 | 19.0 | 106875 | 57.6 | 540 | 118 |
| 8 | 75.0 | 75.0 | 19.0 | 106875 | 46.5 | 430 | 95 |

Figure 6:
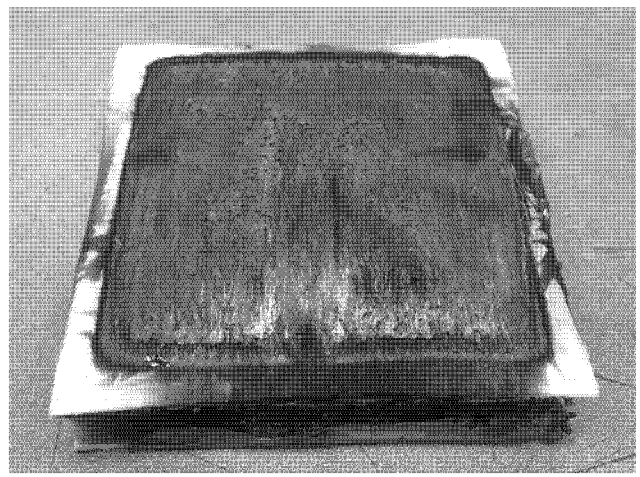
FIG. 6 are images of a fire-retardant composite of the present invention after R10, HL2 smoke density testing according to ISO 5659-2.
Figure 6:
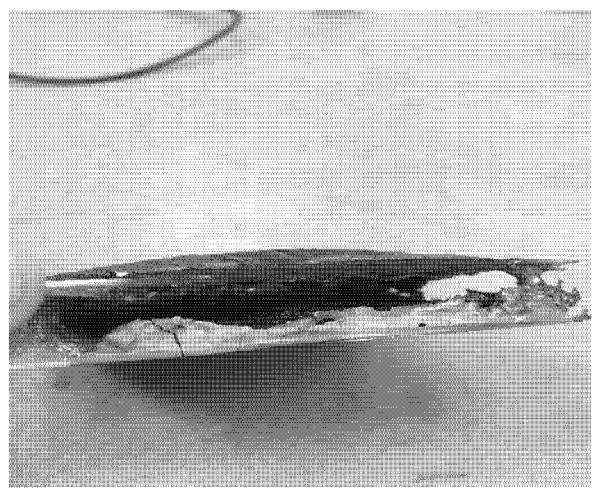

From the data, it was determined that the composites with the fire-retardant laminates and the PET core passed the smoke density HL2 tests of the R10 category of the EN 45545-2 standard. FIG. 6 are images of the composite from Sample 5 after testing.

ISO 9239-1 Testing.

Tests for compliance with flooring fire standards were performed. Composite Samples 5, 7, and 8 were tested according to ISO 9239-1 standard (Reaction to fire tests for floorings-Part 1: Determination of the burning behavior using a radiant heat source. Table 6 lists the results.

TABLE 6

| Sample No. | Length (mm) | Width (mm) | Thickness (mm) | Density (kg/m$^3$) | CHF* (kW/m$^2$) | HF-30 (kW/m$^2$) | VFI (% · min) |
|---|---|---|---|---|---|---|---|
| 5 | 1050 | 230 | 19 | 430 | 7.10 | 7.1 | 97.08 |
| 7 | 1050 | 230 | 19 | 540 | 7.80 | 7.3 | 69.47 |
| 8 | 1050 | 230 | 19 | 430 | 7.73 | 8.2 | 97.08 |

*CHF—Critical heat flux; HF—heat flux

ISO 5660 Testing—Cone Calorimeter.

Composite Samples 4, 5, 7 (100 mm×100 mm×18 mm with a density of 430 kg/m$^3$) were tested according to ISO ISO 5660 standard. The MAHRE (kW/m$^2$) was 107 for Sample 4, 84 for Sample 5, 69 for Sample 7 and 64 for Sample 8. From the data, it was determined that the fire-retardant laminates passed the smoke density HL2 test of R10 category and the MAHRE test requirement of the EN 45545-2 standard.

Example 5

Comparative Testing

Figure 7A:
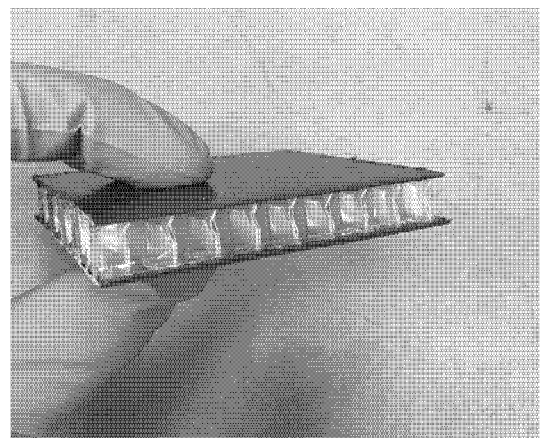
FIG. 7A is an image of a comparative composite having a polypropylene core and polypropylene fire-retardant laminates prior to testing.
Figure 7B:
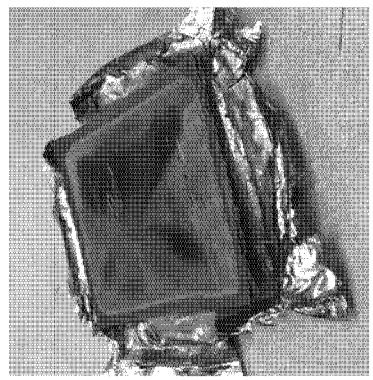
FIG. 7B are images of the comparative fire-retardant composite of FIG. 7A after R10, HL2 smoke density testing according to ISO 5659-2.
Figure 7B:
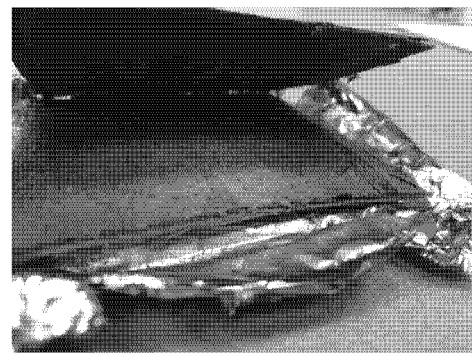

Compliancy tests for the rail transportation industry standards was performed according to EN 45545-2, category R1 for a composite made according to Example 3 with fire-retardant laminate containing 3 plies, but having a polypropylene honeycomb core. The sample had an average R1 smoke density of 350. FIGS. 7A and 7B are images of the sample before and after testing. The sample with a PP and fire-retardant laminates did not pass the smoke density testing.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A fire-retardant composite comprising:
   (a) a porous core material comprising a first thermoplastic polymer comprising polyethylene terephthalate, a fire-retardant polypropylene, a polycarbonate, a polyimide, a polyethersulfone, a polyurethane, or a poly(phenylene ether)/styrene blend, or a blend thereof;
   (b) a first fire-retardant laminate disposed on a first side of the porous core, the first fire-retardant laminate comprising at least one ply, the ply comprising:
      (i) at least 15 wt. %, based on the total weight of the ply, of a second thermoplastic polymer comprising a polypropylene, a polycarbonate, or a polyimide, or a blend thereof;
      (ii) 4 to 10 wt. %, based on the total weight of the ply, a fire-retardant composition comprising a metal oxide and a nitrogen-phosphorous compound;
      (iii) 50 to 80 wt. %, based on the total weight of the ply, of fibers; and
      (iv) 0.01 to 2 wt. %, based on the total weight of the ply, of a coupling agent;
   (c) a second laminate disposed on a side opposite the first side of the core, wherein the second laminate is the same or different than the first fire-retardant laminate; and
   (d) at least one adherent layer contacting at least a portion of the surface of the porous core material and at least a portion of the surface of at least one of the laminates;
   wherein the fire-retardant composite has a four minute smoke density, $D_s$, of less than about 300 as measured by ISO 5659-2 on a 75×75×18 mm thick composite.

2. The fire retardant composite of claim 1, wherein the second thermoplastic polymer is polypropylene.

3. The fire-retardant composite of claim 1, wherein the metal oxide is zinc oxide.

4. The fire-retardant composite of claim 1, wherein the fire-retardant composition further comprises a nitrogen-phosphorous compound selected from the group consisting of melamine pyrophosphate, piperazine pyrophosphate, ammonium polyphosphate, and mixtures thereof.

5. The fire-retardant composite of claim 1, wherein the coupling agent is selected from the group consisting of maleic anhydride grafted polypropylene, maleic anhydride polyethylene, and mixtures thereof.

6. The fire-retardant composite of claim 1, wherein the adherent layer comprises ethylene vinyl acetate, polypropylene, polypropylene-polyethylene terephthalate blends, acrylics, nitriles, silicone rubbers, styrene-butadiene-styrene copolymers, styrene-ethylene/butylene-styrene copolymers, styrene-ethylene/propylene copolymers, styrene-isoprene-styrene copolymers, or a combination thereof.

7. The fire-retardant composite of claim 1, wherein the first thermoplastic polymer is selected from the group consisting of a polyethersulfone, a polyurethane, or a poly(phenylene ether)/styrene blend, or a blend.

8. The fire-retardant composite of claim 1, wherein the fibers comprise glass fibers, carbon fibers, aramid fibers, polyethylene fibers, polyester fibers, polyamide fibers, ceramic fibers, basalt fibers, steel fibers or combinations thereof, and the fibers have an average diameter of 3 to 30 microns.

9. The fire-retardant composite of claim 1, wherein the composite has an average thickness between 1 mm and 100 mm.

10. The fire-retardant composite of claim 1, wherein, the second laminate is the same as the first fire-retardant laminate.

11. A fire-retardant composite comprising
   (a) a porous core comprising a polyethylene terephthalate foam;
   (b) a first fire-retardant laminate disposed on a first side of the porous core, the first fire-retardant laminate comprising one or more plies, at least one ply comprising:
      (i) at least 15 wt. %, based on the total weight of the ply, of polypropylene;
      (ii) 4 to 10 wt. %, based on the total weight of the ply, of a fire-retardant composition comprising zinc oxide and piperazine pyrophosphate;
      (iii) 50 to 80 wt. %, based on the total weight of the ply, of glass fibers; and (iv) 0.01 to 2 wt. %, based on the total weight of the ply, of a coupling agent;
(c) optionally, a second laminate disposed on a side opposite the first side of the core, wherein the second laminate is the same or different than the first fire-retardant laminate; and
(d) at least one adherent layer between the first fire-retardant laminate and the core, the optional second laminate and the core, or both.

12. The fire-retardant composite of claim 11, wherein the fire-retardant composite has a four minute smoke density, $D_s$, of less than about 300 as measured by ISO 5659-2 on a 75×75×18 mm thick composite, and a maximum average heat release (MAHRE) of equal to or less than 90 kW/m$^2$ measured according to ISO 5660-1:2015 on a 100 mm×100 mm×18 mm thick composite at 25 kW/m2.

* * * * *